Figure 1:
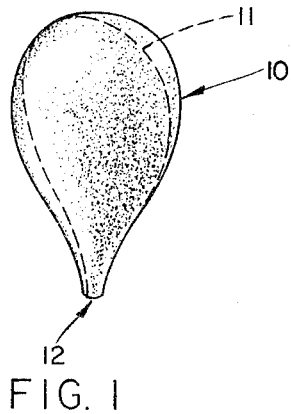

Sept. 6, 1966   J. H. BRILLINGER   3,271,484
MANUFACTURE OF BALLOONS
Filed Dec. 31, 1963   2 Sheets-Sheet 1

Sept. 6, 1966     J. H. BRILLINGER     3,271,484

MANUFACTURE OF BALLOONS

Filed Dec. 31, 1963     2 Sheets-Sheet 2

United States Patent Office 3,271,484
Patented Sept. 6, 1966

3,271,484
MANUFACTURE OF BALLOONS
James H. Brillinger, Belmont, Mass., assignor to W. R. Grace & Co., Cambridge, Mass., a corporation of Connecticut
Filed Dec. 31, 1963, Ser. No. 334,823
3 Claims. (Cl. 264—25)

This invention relates to the manufacture of non-spherical balloons having envelopes formed of crosslinked or partially crosslinked plastic films. Non-spherical balloons have an important position in meterology. For example, the tear-drop shape will ascend at considerably faster rates and with less oscillation than will spherical balloons and, if a captive balloon is to be flown, a stream-lined shape provided with air foils will not be blown down by the wind. It has, however, been extremely difficult to produce the thin membrane in a non-spherical shape. Consequently, non-spherical balloons are usually produced by cutting out "orange peel" sections and heat-fusing the sections along their margins. Again, this produces manufacturing difficulties and high cost, for a tremendous length of seam must be perfectly made in each balloon.

In the United States patent applications of John E. Ehrreich et al., Serial No. 112,430, now Patent No. 3,149,-017, filed May 24, 1961, and John E. Ehrreich, Serial No. 112,183, filed May 24, 1961, processes were disclosed which produced thin, plastic balloons from thick, much smaller preforms. The balloons which result from these processes are characterized but by a single seam which is made in the preformed stage. The entire disclosures of both of the above applications are herein incorporated by reference.

The characteristic feature of the processes of the said applications includes inflation of the preform which, subsequent to the formation of the seam, has been partially crosslinked. Further, during the inflation which produces the thin, enlarged balloon envelope, the seam area is maintained above the crystalline transition temperature of the polymer. Therefore, despite the double thickness of the seam area, the mass of that area is drawn into the expanding areas of the balloon by the inflation pressure. The result is a balloon which has truly unitary structure. In application No. 112,183 crosslinking of the polymer is secured by chemical means through the addition of a chemical crosslinker to the polymeric mass and the subsequent exposure of the preform to a temperature sufficiently high to cause the decomposition and the resulting crosslinking of the material in the preform.

The processes disclosed are ideally suited to the manufacture of spherical balloons, because when a linear polymer, which is partially crosslinked, is stretched, the rate of strength increase per unit area or cross section at temperatures near or above the crystalline transition temperature exceeds the loss of strength which is attributable to the reduction of cross sectional areas. The total force required to continue elongation of the film increases as the cross section decreases and the applied force thus acts on the thicker portions of the film that have not yet developed their maximum strength. In this manner, thick regions of the polymer add to the growing film areas and when free inflation is permitted, a spherical balloon wtih surprisingly uniform wall thickness results.

The foregoing conditions hold true only for spherical shapes where the balloons have minimum surface areas. For shapes other than spherical, the stress-strain relationship per unit area in any given sector is a function of the radius of curvature of that sector. If the tear-drop preform is free blown, it will assume a spherical shape through the greater part of the blowing cycle, but it will leave an excess of thick starting material at the narrow end of the tear drop. If inflation thereafter is continued, the force which is required to expand this thick material exceeds the strength of the fully blown material in the base of the tear drop, the balloon will burst. Judicious design of the preform will permit blowing of other than spherical shapes, but the resulting balloons generally will not possess a uniform wall thickness.

When it is attempted to overcome this difficulty by inflating the preform inside of some restricting body, i.e., a porous or perforated mold which will impart its non-spherical shape to the completed balloon, the conditions which subsist in the case of the free inflation of a preform are upset. Too frequently it is the experience that if an area of the expanding preform which has not as yet been fully expanded comes into contact with the interior of the former, the forces of adhesion are added to the internal friction of the polymer. Thereupon that local mass of polymer in contact with the former very often becomes unable to add its substance to the expanding area of the balloon. If inflation is continued, a blowout of the film usually occurs.

I have discovered that if the inflation of the preform within the confining envelope is so carried out that the preform may expand freely yet not be permitted to come into substantial contact with the confining envelope until the expanded preform has reached its approximate final dimension, that the material can then be blown or expanded into firm overall contact with the confining envelope, cooled within the envelope while the pressure which brought about the inflation is maintained at an undiminished value, and then removed from the envelope. The balloon which results will have the shape imparted to it by the former, that is, it can be streamlined, or otherwise non-spherical, and no blowouts will occur as the preform is inflated to balloon size. Non-spherical balloon shapes having much improved uniformity of wall thickness result.

A brief description of the processes by which preforms are manufactured as disclosed by the above-identified application follows.

If the process of application No. 112,430 is to be followed, a flat blank is cut from a sheet of polymeric material, e.g., polyethylene, which has a thickness, determined by the desired inflated size of the balloon, materially greater than that of the final film. Two such sheets are laid up, and their marginal areas are fused by a heat-sealing operation. The heat sealing may be performed by pressing a shaped, heated bar or a wire against the top layer of polyethylene, or an electronic high-frequency "sewing machine" may be used to "stitch" the two sheets together adjacent their margins. Subsequent to the heat-sealing operation, the preform is subjected to high-energy radiation. If the process of application No. 112,183 is used, comminuted polymer and a crosslinking agent are blended together. The blend is then formed into pellets. The pelleted blend may be sheeted out, or it may be directly molded into a paddle form. In both the pelleting and sheeting or forming steps care must be taken that the temperature at which the pellets or sheets are formed is sufficiently below the decomposition temperature of the crosslinking agent so that no more than approximately 2 percent of the agent will be decomposed.

Two paddle shaped blanks whether made by molding or cut from the sheeted blend, are laid up with an interposed sheet of some heat resistant non-sticking material, i.e., polytetrafluoroethylene, cut in the same shape but with sufficiently smaller dimensions to leave a marginal seaming area extending beyond the interleaver. This sandwich is then placed between two oxygen barrier sheets and squeezed in a heated press which is equipped with a flexible pad on its top platen. The heat and pressure first fuses the polyethylene beyond the margins of the interleaver and so forms the fused seam, and then causes the decomposition of the crosslinking agent and the consequent crosslinking of the polymer.

The procedure which follows is identical whether the preform has been produced by the irradiation or by the chemical crosslinking process. The neck of the preform is slid over a pipe and securely tied. It is then placed in a heated chamber where the temperature is raised to a point a few degrees above the crystalline transition temperature. When that temperature is reached, air is blown into the preform through the pipe, producing greatly enlarged spherical shapes as previously have been described.

The invention may best be understood by reference to the drawings in which

Figure 2:
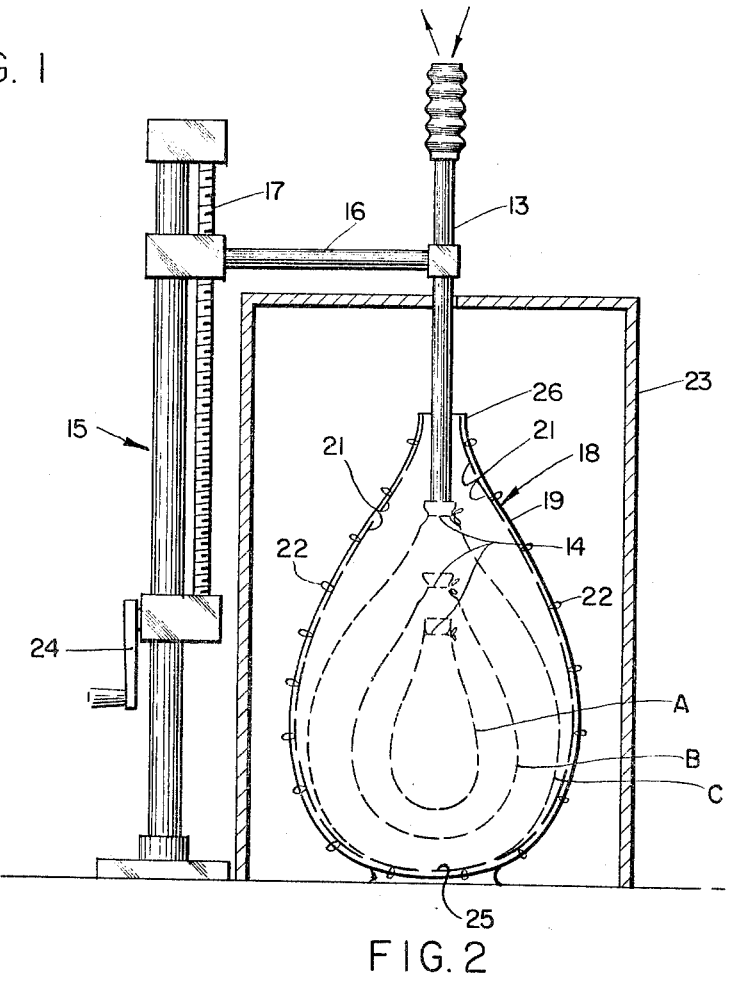
Figure 3:
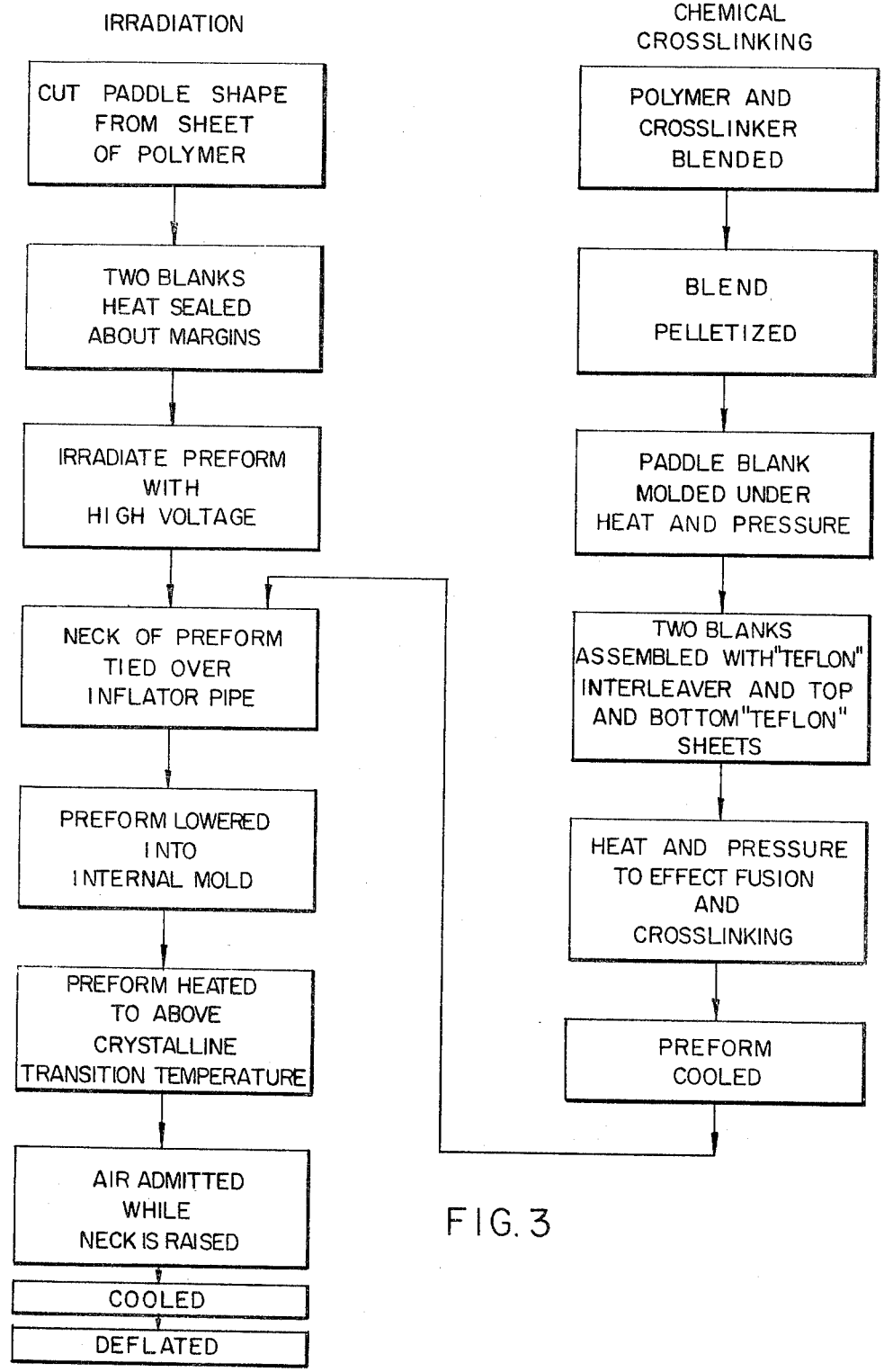

FIG. 1 is a perspective view of a preform made in accordance with the teachings of the above identified applications, FIG. 2 is a diagrammatic representation of the preform inflation procedure, FIG. 3 is a flow sheet setting forth the individual steps of the two manufacturing procedures.

Referring to FIG. 1, the preform 10, is peripherally seamed or "welded" at 11. The heat sealing extends about the entire margin save for the neck opening 12. Referring to FIG. 2, the neck of a preform 10 is slid over the inflation pipe 13 and is tied or clamped at 14. For proper control, pipe 13 is supported by a lifting stand 15 arranged so that its support arm 16 may be raised or lowered by the lead screw 17. Preform 10, now tied to the pipe 13, is then lowered into a permeable or foraminous wall internal mold 18. Mold 18 comprises a rod cage 19 made to the full intended size of the balloon. A liner 21, made from a multiplicity of lunettes of a thin, non-extensible textile such as pretensilized rayon, is held in distended position by the tiebacks 22, which are fastened to the rod cage 19. Thus, the mold is a permeable mold allowing rapid heating and cooling.

The internal mold 18 is positioned within a chamber 23, the atmosphere in which can be heated, usually with circulating hot air. Importantly, the position of the preform 10 within the mold 18 must first be about as indicated by outline A. The preform must not touch the liner 21, but considerable space between the preform 10 and the liner 21 must exist to permit a substantial distention of the lower hemisphere. While in this position, the preform is heated by the air within the chamber 23 until its substance has reached a temperature slightly above the crystalline transition point of the polymer. At this time, the operator admits air through the inflation pipe 13 and as the preform 10 expands, turns the crank 24, progressively raising the inflation pipe 13. As the preform expands through successive stages represented by B, C, etc., both the rate at which air is admitted and the rate of raising the pipe 13, and hence the vertical position of the neck 12, all parts of the preform 10, except a small area at its lower pole 25, may be kept out of contact with the liner 21, until each progressively expanding area has reached its approximate final dimension. When the neck of the balloon reaches its final elevation 26 the balloon comes into full contact with the liner 21. The flow of air into the balloon is then stopped save for a very small amount introduced to maintain the internal pressure at the cut-off pressure while the balloon cools. When the temperature of the balloon has dropped to below its crystalline transition point, and may even be allowed to return to room temperature, the air within the balloon is released or, preferably, withdrawn, and the collapsed balloon is removed from the internal mold 18.

The shape of the preform determines in large measure the actual linear extension, but the increase in area due to blowing can be 600 or even 900 percent.

Mold 18 may also be a self-supporting structure made of wire screening or metal having many fine overall perforations, provided that the metal be covered by a non-sticking coating of a material such as polytetrafluoroethylene such as is used on bakery pans. The advantage of a wire screen former is that the preform may then be heated by infrared radiation, and the enclosure of the mold within a heated chamber is not necessary.

*Example I*

Two paddle-shaped pieces of polyethylene ("Alathon–14") 18 mils thick were cut from a polyethylene sheet. One sheet was placed on top of the other and the assembly was then placed under a hot wire heat-sealer, which also was shaped in the same paddle form. The hot wire was pressed down on the polyethylene so that, save for the neck opening, the two sheets were fused about their margins. After the seam had cooled, the preform was irradiated as uniformly as possible to a dosage of 10 megarads of electron irradiation by a Van de Graff generator (High Voltage Engineering Model G5). After irradiation, the neck of the preform was slid over the inflator pipe and clamped to the pipe. The preform and the pipe were then lowered into the permeable wall internal mold through its neck. The mold consisted of a streamline envelope of pretensilized rayon held in a distended position by an external rod cage. Tie-backs secured to the rods held the cloth in shape.

This assembly was then placed in a heated chamber, the atmosphere of which was maintained at 255° F. Heating in the chamber continued until the entire preform had passed the crystalline transition temperature (approximately 6 minutes), and then air was admitted through the inflater pipe to inflate the preform at blowing pressures ranging from 10 to 0.10 millibars.

As the preform grew in size, the inflater pipe, and consequently the neck of the preform, was raised within the mold envelope at a rate which prevented any part of the preform (except the extreme end) from touching the walls of the mold. When the neck was raised to its final elevation, and the balloon came in full contact with the liner, the major flow of air into the balloon was cut off and only a sufficient quantity of air was added to maintain the fully inflated volume of the balloon while it was permitted to cool to below the crystalline transition temperature. When the balloon had cooled, the air was withdrawn through the inflater pipe. Thereafter, the collapsed balloon was removed from the mold. Its transverse diameter was 30 inches, its axial length was approximately 50 inches, the final thickness of the film was in the order of 0.8 mil. The blowing pressure ranged from 10 to 0.1 millibars.

*Example II*

A streamline balloon is made as follows: polyethylene ("Alathon-14") pellets are blended with 0.6 weight percent of 2,5-dimethyl-2,5-di (tert-butyl-peroxy) hexane carried in a petroleum ether solvent. A nitrogen sweep was used to remove the solvent during the blending. The coated pellets were thereafter extruded at 135° C. as ¼ inch rods which were then chopped into ¼ inch pellets. About 0.07 pound of pellets is laid on a 6 mil "Teflon" sheet and arranged in rough paddle shape approximately 12 inches across. Another "Teflon" sheet is placed on top of the sandwich and is heated 2 minutes in a flat press under slight pressure at 135° C. The pressure is then raised to 50,000 pounds (total) on a 10 inch ram for 2 minutes while maintaining the temperature at 135° C. The sheet is allowed to cool. A second sheet is made in the same manner. A paddle shaped "Teflon" insert, 6 mils thick with a 3 inch wide neck, is placed between the two polyethylene sheets and 2 additional "Teflon" sheets are placed on each side.

This sandwich is placed in a press and heated at 204° C. and 20,000 pounds (total) pressure for 10 minutes. The fused crosslinked polyethylene sheets are then cooled. The "Teflon" insert is removed and the preform is then inflated in an internal mold according to the procedure as described in Example I. The transverse diameter of the balloon is 30 inches, its axial length is about 50 inches. The final thickness of the film is in the order of 0.8 mil.

The degree of linear extension of polymer in passing from the preformed to the expanded state will, of course, depend upon the non-spherical shape which is desired. It may, for example, be 100 percent transverse and 600 percent longitudinal, but may have greater or less expansion ratios within the extendability potential of the preform. Preforms of sufficient thickness, if inflated without external restraint, are capable of linear extension in both directions of approximately 900 percent.

Materials which are suitable for practice of this process are polyethylenes having Densities lying between 0.910 and 0.965,
Melt indices [1] lying between 0.01 and 9.0,
Average molecular weights lying between $10^4$ to $10^6$,
Transition temperatures [2] degrees centigrade 103 to 140,
Tensile strength, p.s.i. at 25° C. as extruded, 18 mils thick, 1-inch-wide strip, 500 to 5500,
Crystallinity percent,[3] 30 to 95,
Elongation percent, 20 to 20,000.

In addition to polyethylenes, copolymers, graft polymers, and block polymers containing up to 25 weight percent of such monomers as butene, di-ethyl maleate, and 2-ethyl hexyl acrylate are suitable.

Suitable crosslinking agents are benzoyl peroxide; 2,5-dimethyl-2,5-di(tertiary butyl peroxy)hexyne-3; dicumyl peroxide; and 2,5-dimethyl-2,5-di(tertiary butyl peroxy)-hexane. For examples of other peroxides see Chemical Processing, volume 23, No. 11, page 72, and United States Patents 2,826,570, 2,888,424, and 2,916,481.

The extent of crosslinking can be determined by the percent of gel remaining after extraction for 24 hours in a Soxhlet extractor with refluxing benzene. The gel content of crosslinked polyethylene should be in the range

[1] As determined by ASTM D1238-5T at 190° C.
[2] As determined by crosspolarizers on a hot stage microscope.
[3] As determined by X-ray defraction (approximate values).

40 to 80 weight percent and preferably greater than 55 percent.

Raising the preforms within the mold as the expansion of the preform progresses may be made automatic by supporting the inflater pipe on the piston of an air cylinder and controlling the admission of air through a regulator valve. But the crank and lead screw apparatus which has been described effectively will produce small quantities of balloons economically and will avoid the difficulties of blow-out which hitherto have plagued the manufacture of balloons formed from thin and substantially gas-impermeable films.

I claim:
1. The method of forming a permanently non-spherical balloon which includes fitting the neck portion of a partially crosslinked olefin polymer hollow balloon preform on an inflater pipe, suspending the preform by the pipe within a permeable wall internal mold having the approximate size and shape of the intended balloon, heating the preform to above the crystalline transition temperature of the polymer, inflating the preform with a gas at moderate pressure and simultaneously raising the preform within the mold, thereby to prevent any but the pole portion of the expanding preform from touching the mold until the preform has expanded approximately to its final size, continuing the expansion until all areas save the neck extremity are in contact with the mold, cooling the balloon while maintaining the final inflation pressure, deflating the balloon and removing it from the mold.

2. Process of claim 1 wherein the mold consists of a multiplicity of lunettes of a substantially non-stretchable fabric joined together to form a hollow, non-spherical shape, the said mold being held in distended position by its attachment to a cage element.

3. Process of claim 1 wherein the mold is composed of wire screening coated with polytetrafluoroethylene and wherein the preform is heated by infrared radiation directed through said screen.

References Cited by the Examiner
UNITED STATES PATENTS

| | | | |
|---|---|---|---|
| 2,994,108 | 8/1961 | Bjorksten | 264—94 |
| 3,106,441 | 10/1963 | Harrison et al. | 264—94 X |

ROBERT F. WHITE, *Primary Examiner.*

A. R. NOE, *Assistant Examiner.*